(12) United States Patent
Hajji et al.

(10) Patent No.: US 7,937,575 B2
(45) Date of Patent: May 3, 2011

(54) INFORMATION PROCESSING SYSTEM, PROGRAM PRODUCT, AND INFORMATION PROCESSING METHOD

(75) Inventors: Hassan Hajji, Yamato (JP); Seiichi Kawano, Sagamihara (JP); Masana Murase, Yokohama (JP); Susumu Shimotono, Hadano (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1513 days.

(21) Appl. No.: 11/312,001

(22) Filed: Dec. 19, 2005

(65) Prior Publication Data
US 2006/0136708 A1    Jun. 22, 2006

(30) Foreign Application Priority Data
Dec. 20, 2004   (JP) .................................. 2004-367548

(51) Int. Cl.
*G06F 9/00*    (2006.01)
(52) U.S. Cl. .......................................................... 713/1
(58) Field of Classification Search .................... None
See application file for complete search history.

(56) References Cited

U.S. PATENT DOCUMENTS

| | | | |
|---|---|---|---|
| 6,715,043 B1 | 3/2004 | Stevens | 711/154 |
| 7,073,064 B1* | 7/2006 | Angelo et al. | 713/176 |
| 2003/0221094 A1 | 11/2003 | Pennarun | 713/1 |
| 2004/0068726 A1 | 4/2004 | Levy et al. | 718/1 |
| 2004/0117610 A1* | 6/2004 | Hensley | 713/2 |
| 2004/0268340 A1 | 12/2004 | Steeb et al. | 717/174 |
| 2005/0138393 A1* | 6/2005 | Challener et al. | 713/186 |
| 2005/0138409 A1* | 6/2005 | Sheriff et al. | 713/200 |

FOREIGN PATENT DOCUMENTS

| | | |
|---|---|---|
| JP | 10-333902 | 12/1998 |
| JP | 2000-207176 | 8/1999 |
| JP | 2001-155420 | 6/2001 |

OTHER PUBLICATIONS

Intel Corporation, "Boot Integrity Services Application Programming Interface", Dec. 28, 1998, Intel Corporation, Version 1.0.*

* cited by examiner

*Primary Examiner* — Nasser Moazzami
*Assistant Examiner* — Michael S McNally
(74) *Attorney, Agent, or Firm* — Antony P. Ng; Dillon & Yudell LLP

(57) ABSTRACT

A boot block that contains a first public key is activated and a system Basic Input/Output System (BIOS) that contains a second public key and a first digital signature is verified, the verifying being performed by confirming that the first and second public keys match. In response to a determination that the first and second public keys match, the BIOS is activated and a system image is loaded to a real device. The system image is verified by confirming that the first digital signature that is stored in the system BIOS matches a second digital signature that is stored in a mass storage device. In response to the first and second digital signatures matching, a virtual mass storage device is created. Control of the virtual mass storage device is transferred to a boot strap code in an operating system image and the operating system image is booted from the virtual mass storage device.

20 Claims, 7 Drawing Sheets

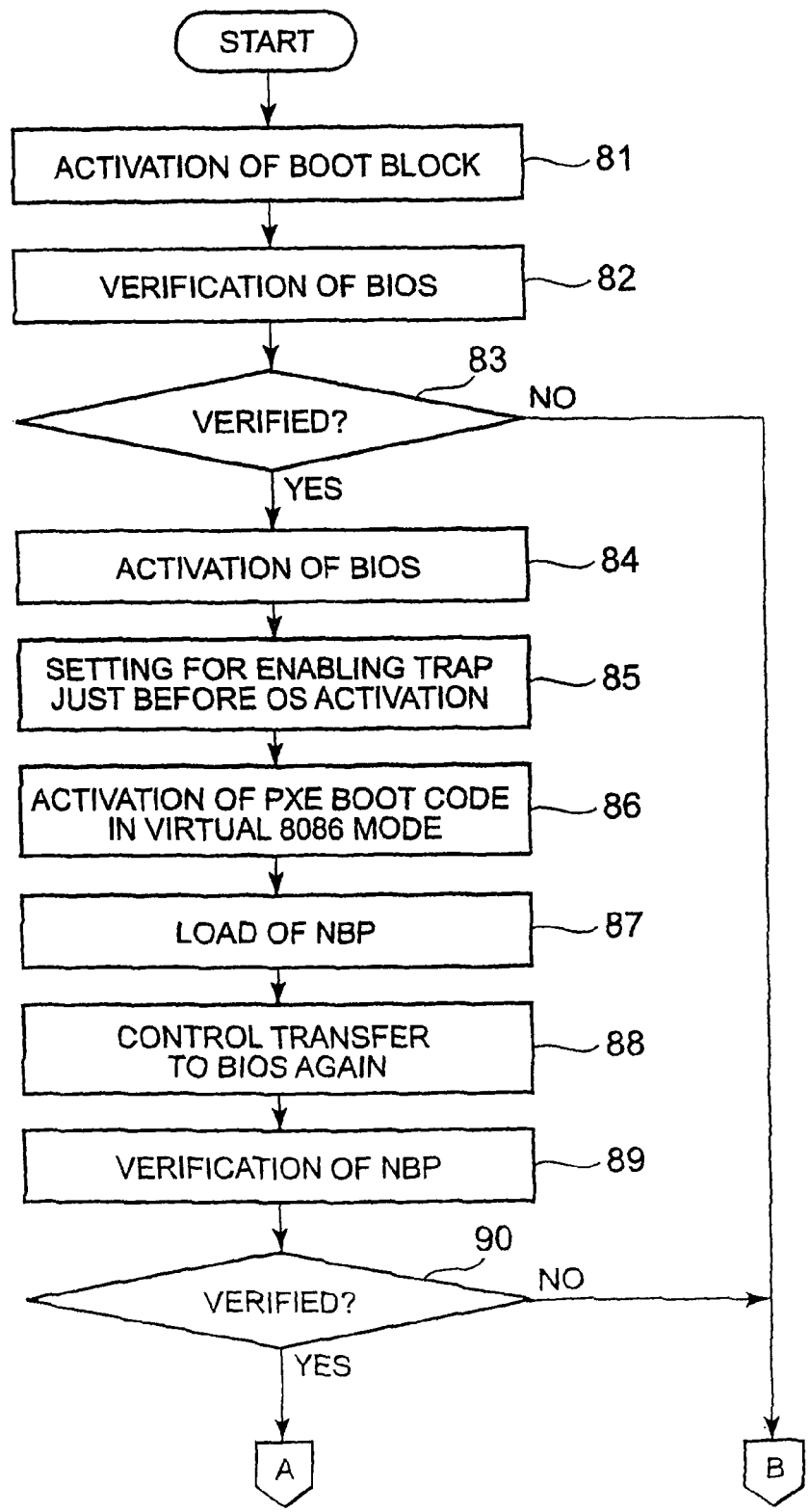

INFORMATION PROCESSING SYSTEM, PROGRAM PRODUCT, AND INFORMATION PROCESSING METHOD

PRIORITY CLAM

This application claims priority of Japanese patent application No. JP 2004-367548, filed on Dec. 20, 2004, and entitled, "Information Processing System, Program Product, and Information Processing Method."

BACKGROUND OF THE INVENTION

1. Technical Field

The present invention relates in general to loading a system image. More specifically, the present invention relates to a method, system and computer program product for verifying that a system image is non-corrupt, and then forming a virtual device by adding a change to an interface used for a bootstrap code in the verified system image and an OS activated thereby to access a predetermined real device in order that the bootstrap code and the OS may be utilized.

2. Description of the Related Art

In recent years, convenience of communication has improved due to progress in technology for networking, allowing various services to be provided through a network. As a result of this improvement, the need to transmit personal information on the network has increased, as the desire for security in a personal computer and the desire for secure infrastructure, including network protocols.

In order to meet these requirements, reliability of an operating system (OS), which is operable on a personal computer, is important. Additionally, spyware threatens security by monitoring keyboard input and frame buffers of displays.

Prior art methods for solving such problems include a method for using a platform in conformity with standards of the Trusted Computing Group (TCG) and Boot Integrity Services (BIS) in the Preboot Execution Environment (PXE) standard.

Incidentally, the TCG standard discloses a computer system in which, even if an OS combined with an application program or a user interface is not installed or writable magnetic media are not provided, an application program or user interface may be loaded from CD-ROM media or a network to be executed.

A platform in conformity with aforementioned TCG standard or providing BIS in accordance with the PXE standard, however, is difficult to install and support. In addition, the prior art provides no technique for securely booting the existing OS.

TCG is not intended to securely perform a system operation, and can only provide a mechanism for confirming security of a process and a module before the system operation. In addition, BIS according to the PXE standard defines only an authenticating process for a module downloaded through a network, but does not specify a process for securely performing OS operation.

What is needed is a system to provide a more secure computing environment.

SUMMARY OF THE INVENTION

A boot block that contains a first public key is activated and a system Basic Input/Output System (BIOS) that contains a second public key and a first digital signature is verified, the verifying being performed by confirming that the first and second public keys match. In response to a determination that the first and second public keys match, the BIOS is activated and a system image is loaded to a real device. The system image is verified by confirming that the first digital signature that is stored in the system BIOS matches a second digital signature that is stored in a mass storage device. In response to the first and second digital signatures matching, a virtual mass storage device is created. Control of the virtual mass storage device is transferred to a boot strap code in an operating system image and the operating system image is booted from the virtual mass storage device.

BRIEF DESCRIPTION OF THE FIGURES

FIG. 6 is a flow chart showing a boot procedure in the system shown in FIG. 4.

DETAILED DESCRIPTION OF A PREFERRED EMBODIMENT

The present invention includes loading a system image including a boot image for composing a system, verifying that the loaded system image is correct, and forming a virtual device by adding a change to an interface used for a bootstrap code and an OS to access a predetermined real device in order that the bootstrap code in the image for boot, which is verified by the verification means. The OS activated thereby may be utilized.

The system image may include, for example, an image of a required application program in addition to an image for boot. The system image may be loaded from, for example, a CD-ROM drive, a server on the network, a hard disk, or a USB memory. The bootstrap code includes a code that is read first to start a boot sequence among system images. An OS is activated from a read only data medium (for example, CD-ROM, or DVD-ROM).

Figure 1:
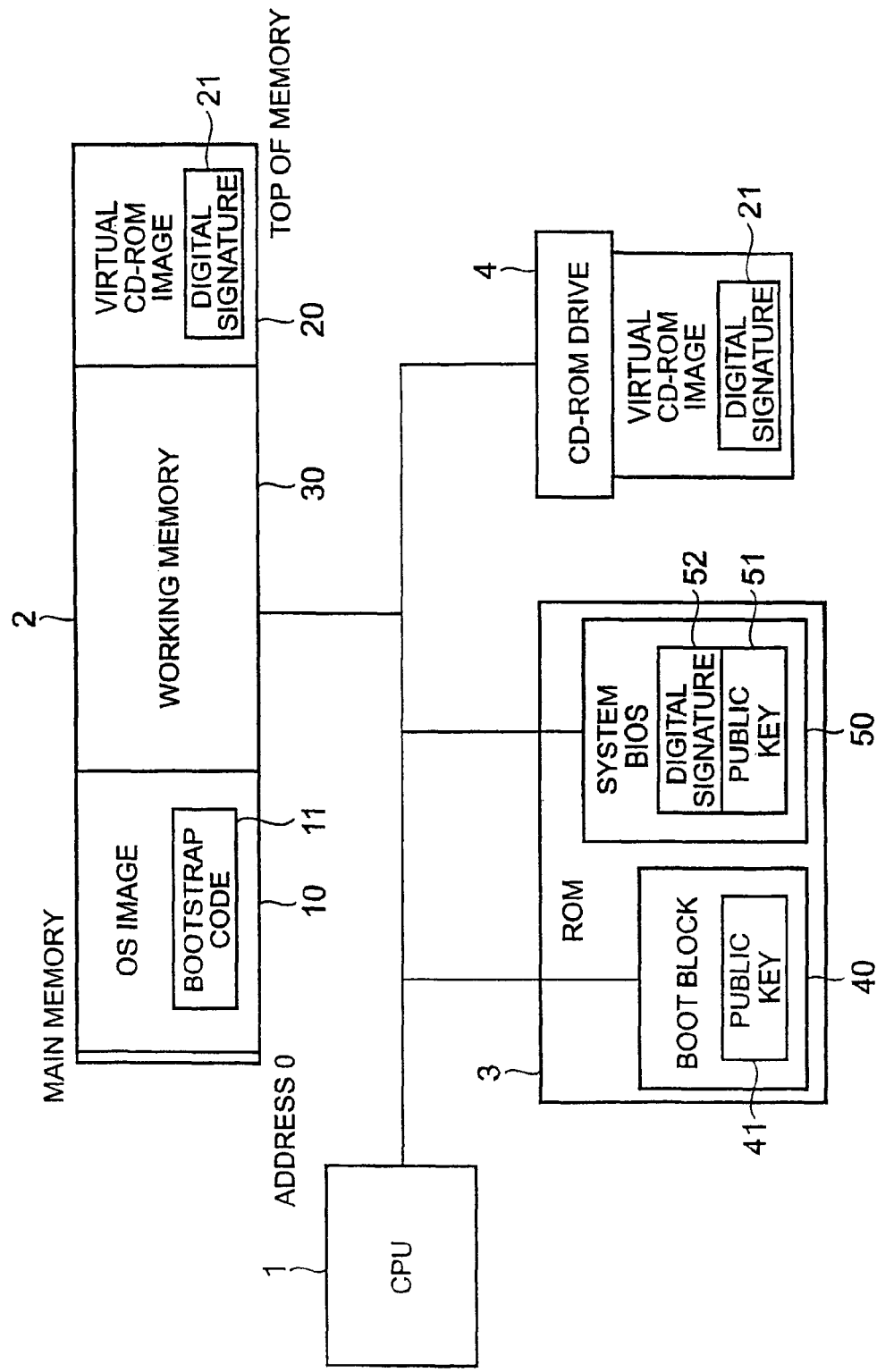
FIG. 1 is a block diagram showing a main configuration of an information processing system according to one embodiment of the present invention.

FIG. 1 is a block diagram showing a main configuration of an information processing system according to one embodiment of the present invention. As shown in FIG. 1, the system includes a CPU 1 for executing an operation based on a program product and controlling a data flow, a main memory 2 for causing the CPU 1 to access both a program product being executed and related data at high speed, a ROM 3 for storing a system BIOS and other related information, and a CD-ROM drive 4 capable of reading data from a CD-ROM for boot operations.

Main memory 2 includes an area 10 for storing an OS image, an area 20 for storing a virtual CD-ROM image, and an area 30 for operation (working memory). A bootstrap code 11, which is executed upon booting, is also stored in the area 10. The virtual CD-ROM image is accompanied by a digital signature 21 obtained by encrypting a hash value calculated by applying a predetermined hash function to the image with a secret key. The virtual CD-ROM image is composed of system images including an OS module and an application program.

A boot block 40 that is first executed upon turning on the power and a system BIOS 50 are stored in ROM 3. Boot block 40 is set to be writable only before factory shipment and cannot be changed afterward. In other words, boot block 40 embodies a Core Root Trusted Measurement (CRTM) in accordance with the Trusted Computing Platform Association (TCPA) specification. CD-ROM drive 4 can read a CD-ROM, including the virtual CD-ROM image to be loaded to the aforementioned area 20.

System BIOS 50 is accompanied by a public key 51 corresponding to a secret key used in creating a digital signature 21. System BIOS 50 is also accompanied by a digital signature 52 obtained by encrypting a hash value calculated by applying a predetermined hash function to the image with a secret key. Boot block 40 is accompanied by a public key 41 corresponding to the secret key used for creating digital signature 52.

In a preferred embodiment, loading is achieved by CPU 1, CD-ROM drive 4, and system BIOS 50 or, alternatively by CPU 1, network device 5, PXE server 6, system BIOS 50, and PXE boot code 60 in the embodiment shown in FIG. 4, which will be described below. System verification will, in a preferred embodiment, be composed of CPU 1, digital signature 21, system BIOS 50, public key 51, and digital signature 52 in the embodiment shown in FIG. 1. Alternatively, CPU 1, network device 5, PXE server 6, digital signature 21, system BIOS 50, public key 51, digital signature 52, and PXE boot code 60 will be used in the embodiment shown in FIG. 4. Moreover, a virtual device may be composed of, for example, CPU 1 and system BIOS 50 in the embodiments shown in FIGS. 1 and 4.

According to a preferred embodiment, after loading a system image including an image for boot for composing a system to a predetermined storage area, a verification that the loaded system image is non-corrupt is performed. If the system image is non-corrupt, in order that the bootstrap code in the image for boot verified by the verification means and the OS activated thereby may be utilized, a virtual device is formed by adding a change to the interface used for the bootstrap code and the OS to access the predetermined real device.

When the bootstrap code in the loaded system image is then activated, the bootstrap code will try to boot a real device first, but the access for it will result in an access to a storage area where the system image is loaded because of the virtualization of the device. In addition, when an OS tries to access a real device, it will result in an access to the storage area where the system image is loaded. Accordingly, the boot is to be performed based on the system image that has been verified to be non-corrupt.

Even after the boot is completed, an attempt to access a real device by the OS results in an access to the storage area where the system image is loaded because of the virtualization of the device. In other words, the load for executing the application is always performed from the system image that has been verified to be non-corrupt, thereby making it possible to achieve a secure computing environment.

According to a preferred embodiment of the present invention, the verification that the loaded system image is non-corrupt is performed based on whether or not a hash value obtained by decoding an electronic signature accompanying the system image with a corresponding public key is coincident with a hash value obtained by applying a predetermined hash function to the system image.

The verification that the loaded system image is non-corrupt is performed by the system BIOS. In this case, also for system BIOS, a verification that the system BIOS is non-corrupt is performed. This verification that the BIOS itself is non-corrupt is performed based on the program product and the public key stored in memory means that is fixed to the information processing system so as not to be detached and is non-rewritable; and the digital signature that corresponds to this public key and accompanies the system BIOS.

The load of the system image is performed by download from the server on the network. Before a control is transferred to the bootstrap code in the downloaded system image, the verification that the system image is non-corrupt is performed. The download and the control transfer are performed based on, for example, a procedure in conformity with the PXE standard.

In order to place the verification before the control transfer to the bootstrap code, a preferred embodiment will employ a method of monitoring the control transfer to the bootstrap code using an address monitoring mechanism and its control mechanism that the system has and thereby temporarily transferring the control to a verification operation before the control transfer is performed.

According to a preferred embodiment, in order that the system image is loaded to perform a verification that the system image is non-corrupt and then the bootstrap code in this system image, and the OS activated thereby are utilized, a virtual device is formed by adding a change to the interface used for the bootstrap code and the OS to access a predetermined real device, thereby making it possible to easily achieve a secure computing environment.

Figure 2:
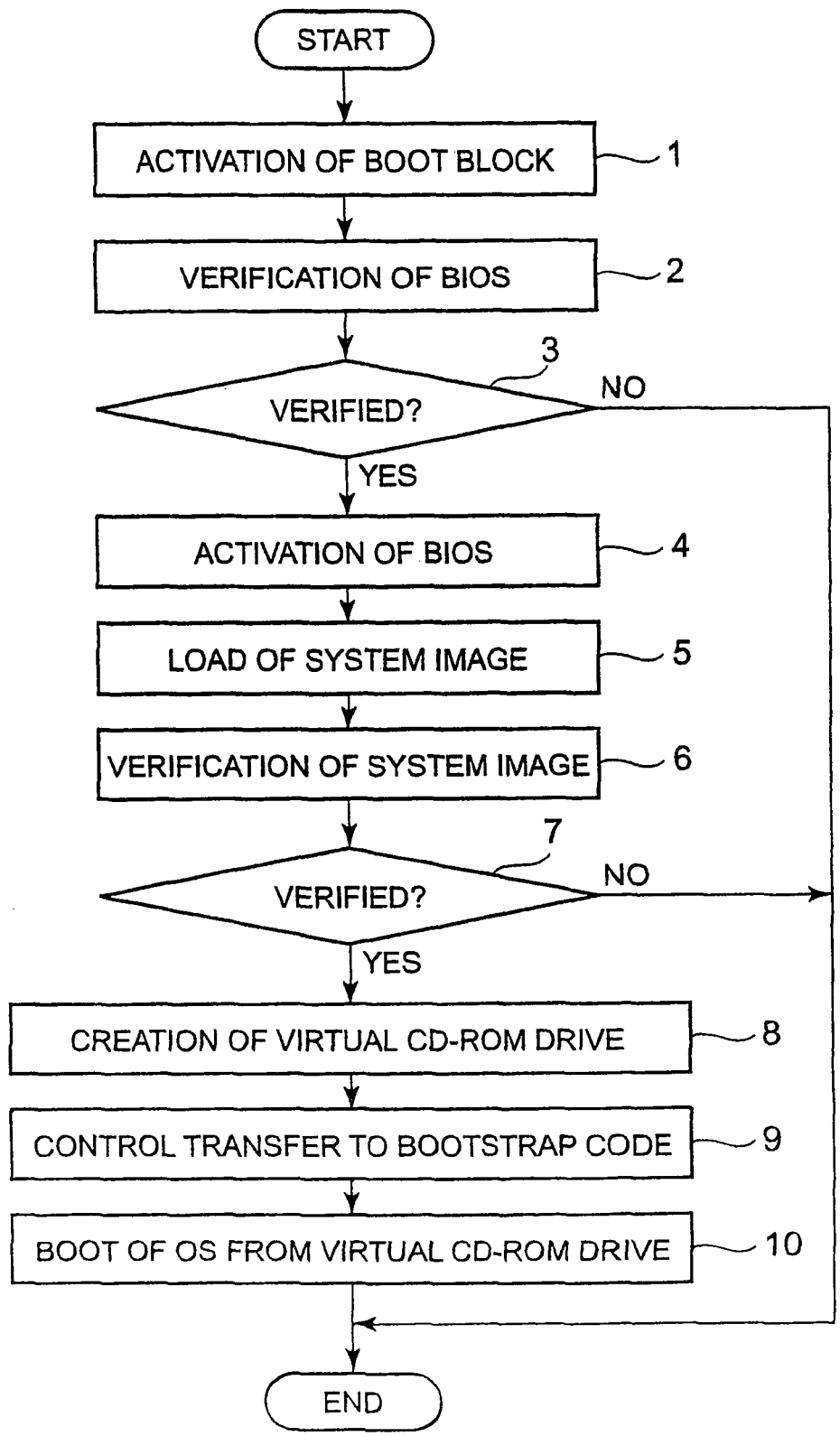
FIG. 2 is a flow chart showing a boot procedure in the system of FIG. 1.

FIG. 2 is a flow chart showing a boot procedure in this system. When the power of the system is turned on, the CPU 1 first executes the boot block 40 in Step 1 to verify that the system BIOS 50 is non-corrupt. Boot block 40 determines whether or not a hash value obtained by decoding digital signature 52 accompanying system BIOS 50 with public key 41 coincides with a hash value obtained by applying the aforementioned hash function to the system BIOS 50, and if it is determined to coincide that the system BIOS 50 is non-corrupt has been verified.

Next, in Step 3, boot block 40 determines whether or not the verification that system BIOS 50 is non-corrupt has been made. If it is determined that the verification has not been made, the boot procedure is terminated. If it is determined that the verification has been made, the procedure proceeds to Step 4 to activate system BIOS 50. In Step 5, system BIOS 50 loads virtual CD-ROM image currently recorded on the CD-ROM mounted on the CD-ROM drive 4 to area 20 of main memory 2.

In Step 6, system BIOS 50 further verifies that loaded virtual CD-ROM image, namely, the system image, is non-corrupt. In other words, the system BIOS 50 determines whether or not a hash value obtained by decoding digital signature 21 accompanying the virtual CD-ROM image with public key 51 coincides with a hash value obtained by applying the aforementioned hash function to the virtual CD-ROM image, and if it determines that they coincide with each other, determines that the virtual CD-ROM image is non-corrupt. As a result of this, verification that the OS and the application program included in the virtual CD-ROM image are non-corrupt has been made. Thus, the non-corrupt OS is a predetermined secure OS, in which the operations of OS modules loaded in memory and permitted to operate are secured.

Next, in Step 7, system BIOS 50 determines whether or not the verification that the system image is non-corrupt has been made. If it is determined that the verification has not been made, the boot procedure is terminated. If it is determined that the verification has been made, the procedure proceeds to Step 8 to create the virtual CD-ROM. When the bootstrap code 11 that is first read from the virtual CD-ROM image and the OS to be activated try to access the CD-ROM drive 4 via an interface INT13 or a device driver, a code called by the INT13 or the device driver is set so as for area 20 of main memory 2 to be accessed. As a result, using the same procedure as booting from CD-ROM drive 4, the boot will be performed from area 20.

Next, in Step 9, system BIOS 50 reads bootstrap code 11 to area 10 and moves the control to area 10. As a result, in Step 10, the OS will be booted. That is, bootstrap code 11 starts booting the OS based on the virtual CD-ROM image of area 20, and while loading a file required for activating the OS through the virtual CD-ROM drive by the aforementioned INT13 to area 10 of memory 2, gradually enhances internal functions of the OS.

During enhancement, when the aforementioned device driver of the virtual CD-ROM operable under the OS environment becomes usable, bootstrap code 11 loads a file required for activating the OS to area 10 using the device driver. Thus, also in an environment where the device driver of the OS is utilized, bootstrap code 11 continues bootstrap in the same procedure as activating the OS via CD-ROM drive 4, based on the virtual CD-ROM image of area 20, and then completes the boot procedure.

Figure 3:
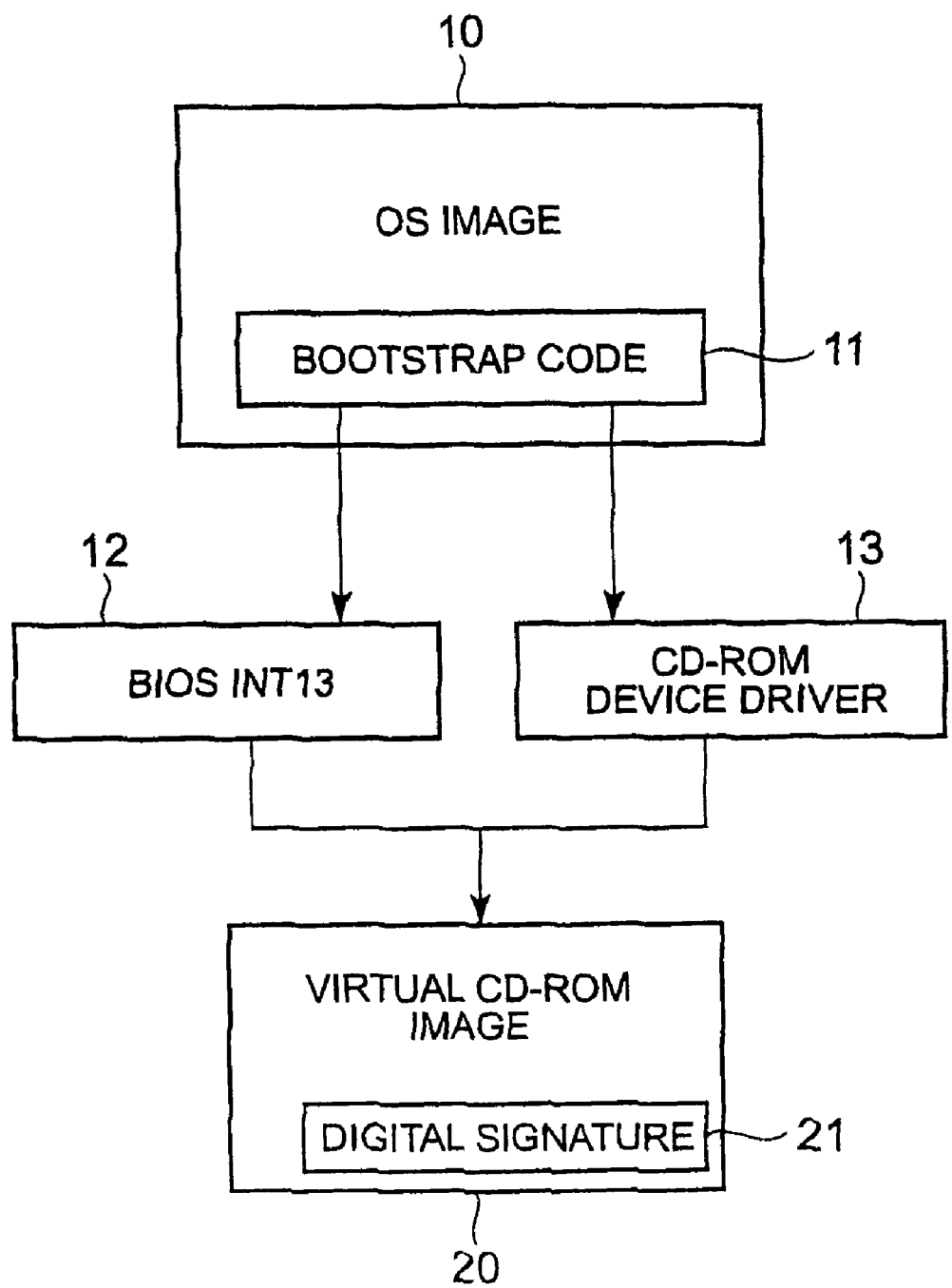
FIG. 3 a block diagram showing a manner for a bootstrap code to access a virtual CD-ROM image.

FIG. 3 is a block diagram showing a manner for bootstrap code 11 to access virtual CD-ROM image on area 20. As shown in FIG. 3, bootstrap code 11 first accesses the virtual CD-ROM image using disk I/O routine INT13 of BIOS 12, and when the boot is advanced and device driver 13 of the virtual CD-ROM is usable, accesses via this device driver 13.

Within this embodiment, the system image is loaded to area 20 to verify that it is non-corrupt, and area 20 is formed into a virtualized device to be provided to the bootstrap code and the OS activated thereby, thus making it possible to easily achieve a secure computing environment.

Figure 4:
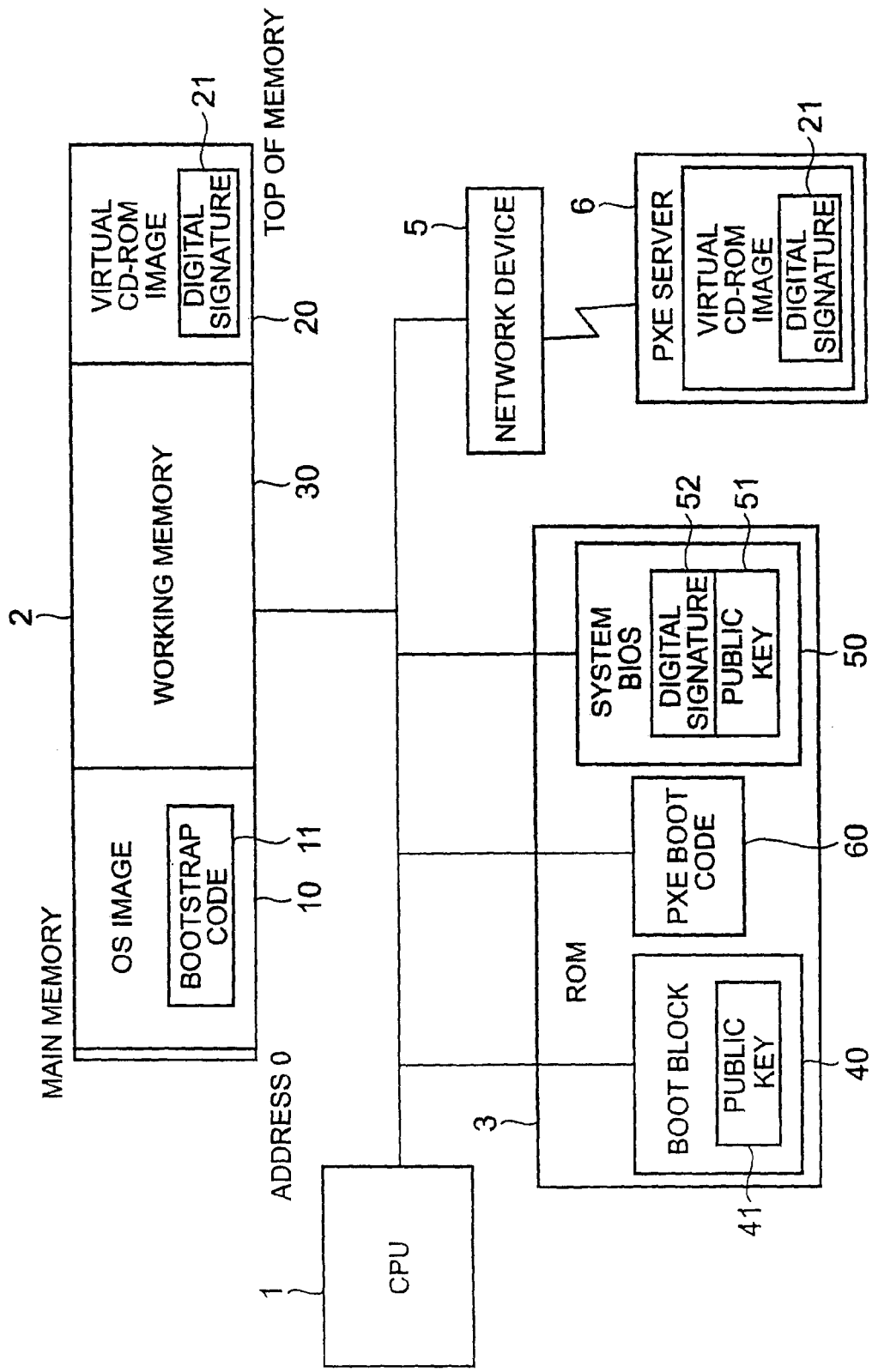
FIG. 4 is a block diagram showing a main configuration of an information processing system according to another embodiment of the present invention.

FIG. 4 is a block diagram showing a main configuration of an information processing system according to another embodiment of the present invention. As shown in FIG. 4, this system is configured in such a way the network device 5 is provided instead of CD-ROM drive 4 in the system shown in FIG. 1, and virtual CD-ROM image is downloaded from PXE server 6 through the network. Moreover, PXE boot code 60 for achieving this is provided in ROM 3.

PXE server 6 provides network boot service ("PXE network boot") in accordance with the Preboot Execution environment (PXE) standard, and stores the virtual CD-ROM image which will be loaded to area 20. Network device 5 is provided with a network interface card conforming to the PXE standard for connecting the system to PXE server 6. PXE boot code 60 conforms to PXE standard, and is provided by a vendor of a network card as a ROM image.

PXE network boot is a technique for sequentially downloading a code block for network bootstrap and a main part of an OS system image from a predetermined node on the network, namely the PXE server, to develop them in the memory and then perform the boot by passing an execution to the downloaded code. In a normal PXE network boot process, when the control is transferred to the PXE boot code from the BIOS, the PXE boot code then performs linkage processing for moving to the boot of the OS. For this reason, before the control is transferred to the OS, the BIOS cannot verify, under the prior art, that the downloaded code is non-corrupt.

Thus, according to this embodiment, system BIOS 50 is configured so as to temporarily obtain an execution right using a memory access trap function that uses a debug register, before the control is transferred to the PXE boot code. A standardized entry address used when the PXE boot code transfers the control to the downloaded code. A fixed physical address (7C00:0000h) is set as an address of the debug register, and the execution of this address is monitored.

When setting the address of the debug register, however, the execution monitor is invalidated. In other words, the PXE boot code itself provided from an external network device vendor unexpectedly utilizes the debug register, so that an execution monitoring function of the physical address 7C00:0000h, which the present invention intends, may be inhibited. For that reason, system BIOS 50 serves as a virtual 8086 monitor as a precondition of a virtual 8086 mode, and restricts the utilization of the debug register using a code other than that of the system BIOS 50. The virtual 8086 mode is one of the protected modes provided by the 8086 processor family, and provides a processor operating environment in which when a code that operates under the mode performs specific operations, a processor exception (trap) for calling an exception handling routine in the virtual 8086 monitor. It is thus possible to suppress and monitor these specific operations. Under this operating environment, when the PXE boot code tries to access the debug register, the processor exception occurs and the access may be invalidated, so that system BIOS 50 can certainly capture that the execution of the code in the fixed physical address is started and can additionally execute a predetermined verification procedure to the downloaded code.

Figure 5A:
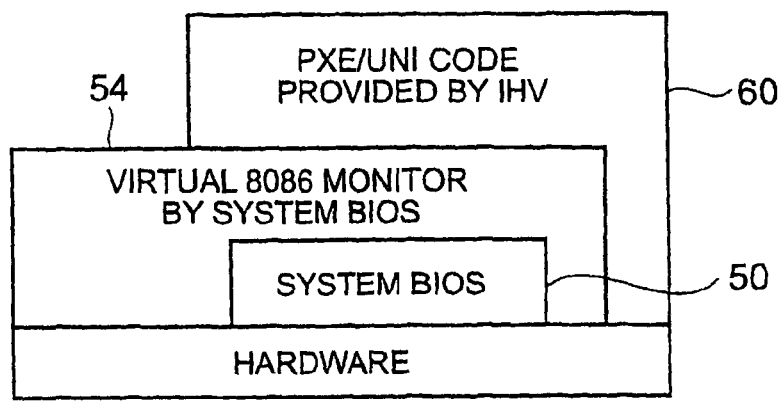
FIG. 5 is a view illustrating a manner of acquiring an execution right by using a trap function in the system shown in FIG. 1.
Figure 5B:
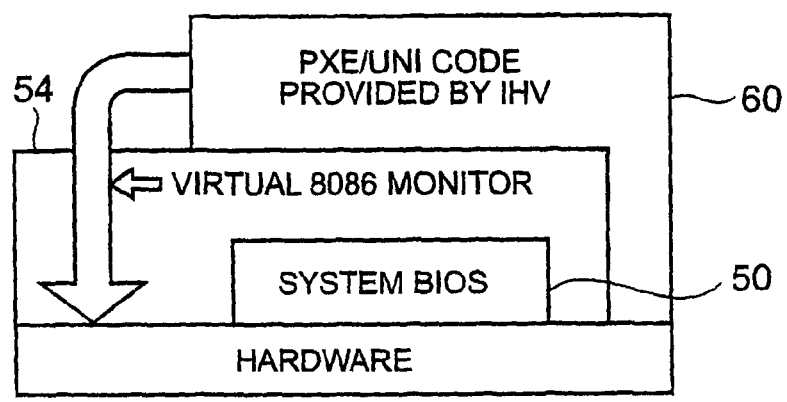
Figure 5C:
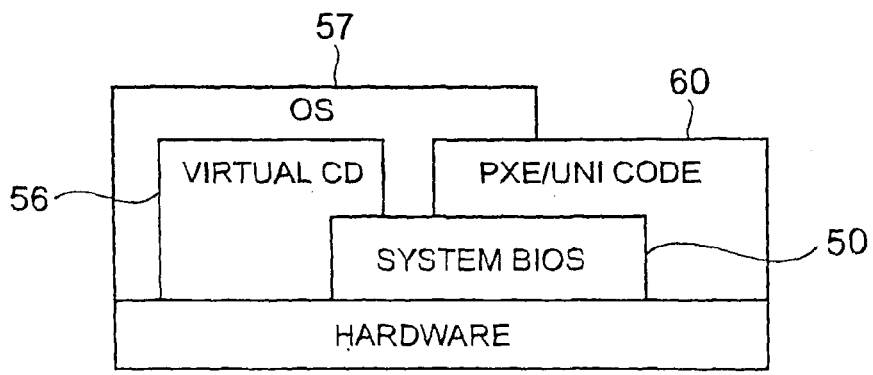

FIG. 5 shows a manner of acquiring the execution right according to this trap function. As shown in FIG. 5A, after constructing a virtual 8086 mode 54, system BIOS 50 calls PXE boot code 60. In FIG. 5A, the virtual 8086 monitor 54 is positioned as if it were surrounding system BIOS 50. The system BIOS 50 is an entity of the monitor in question, and a dedicated code is not newly developed in any location. Thus, system BIOS 50 shows a condition in which system BIOS 50 operates as virtual 8086 monitor 54. After the download of the system image in the form of the virtual CD-ROM image, when PXE boot code 60 tries to transfer the control to an entry address (7C00:0000h) of the downloaded code as shown in FIG. 5B, the processor exception (equivalent to interrupt processing) based on the trap function of the debug register occurs, by which the control is transferred to system BIOS 50. System BIOS 50 then terminates the virtual 8086 mode, and, as shown in FIG. 5C, a virtual CD-ROM drive 56 is created. When verification that the downloaded system image is non-corrupt is further performed, that leads an OS 57 to be booted.

Figure 7:
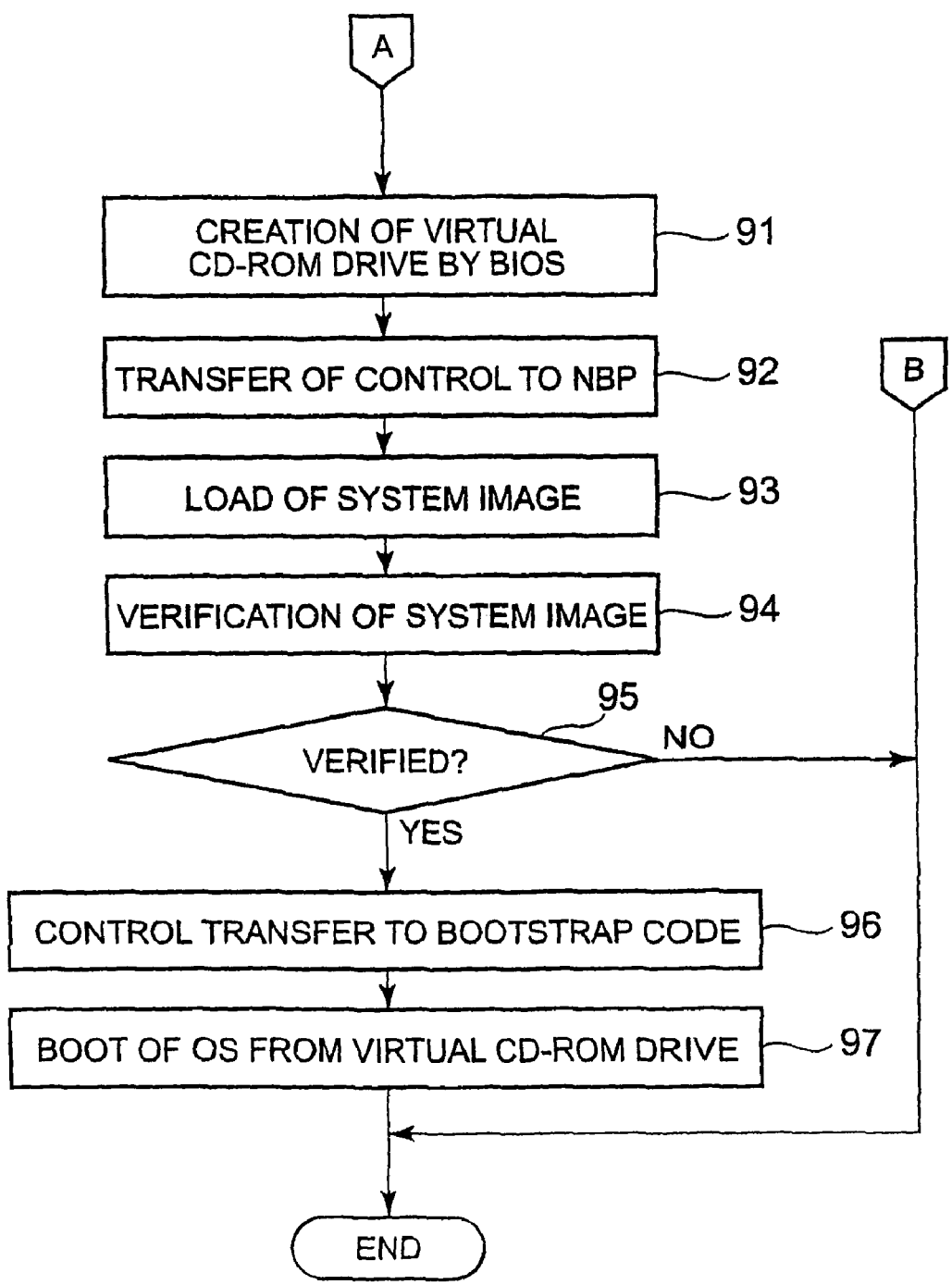
FIG. 7 is a flow chart that is a continuation of the flow chart shown in FIG. 6.

FIGS. 6 and 7 are flow charts showing boot procedures according to an embodiment of the present invention. Processing details of Steps 81 through 84 are similar to those of Steps 1 through 4 shown in FIG. 2. In Step 84, when the system BIOS is activated, the system BIOS sets the aforementioned entry address in the debug register so that the execution right can be acquired by the trap function. The system BIOS further activates the PXE boot code in the virtual 8086 mode in Step 86.

In Step 87, the PXE boot code loads a network boot program (hereinafter, referred to as "NBP") to main memory 2 via the network from PXE server 6 according to the PXE specification. Further, in Step 88, just before the control is transferred to NBP from the PXE boot code, the system BIOS acquires the execution right again by the trap function. Subsequently, in Step 89, the system BIOS verifies that NBP loaded in main memory 2 is non-corrupt. In other words, the system BIOS determines whether or not a hash value obtained by decoding a digital signature accompanying NBP with public key 51 corresponding to this digital signature accompanying the BIOS coincides with a hash value obtained by applying a predetermined hash function to NBP. If they coincide with each other, the system BIOS determines that NBP is non-corrupt.

Next, in Step 90, it is determined whether or not the verification that the NBP is non-corrupt has been made. If it is determined that the verification has not been made, the boot procedure is terminated. If it determines that the verification has been made, the procedure proceeds to Step 91, and the system BIOS creates the virtual CD-ROM drive, and then transfers the control to NBP in Step 92. Incidentally, because the creation of the virtual CD-ROM drive may be completed just before NBP transfers the control to the system image, NBP may create the virtual CD-ROM drive just before the control is transferred to the system image from NBP.

Next, in Step 93, NBP loads an entire system image from PXE server 6. In Step 94, NBP further verifies that the entire system image is non-corrupt. In other words, when a hash value obtained by decoding the digital signature accompanying the system image with the public key 51 corresponding to this digital signature is coincident with a hash value obtained by applying a predetermined hash function to the entire system image, NBP determines the verification that the entire system image is non-corrupt has been made.

The terms "NBP loads a system image" means that NBP suitably arranges the system image in the main memory as the virtual CD-ROM image that the virtual CD-ROM drive should keep as shown also in FIG. 1.

In Step 95, NBP further determines whether or not the verification that the entire system image is non-corrupt has been made. If it is determined that the verification has not bee made, the boot procedure is terminated, and meanwhile if it is determined that the verification has been made, the procedure proceeds to Step 96. The procedures of Step 96 and 97 are similar to those of Steps 9 and 10 shown in FIG. 2.

According to this embodiment, also in booting the network, the system image is loaded to area 20 to verify that it is non-corrupt, and area 20 is formed into a virtualized device to be provided to the bootstrap code and the OS activated thereby, thus making it possible to easily achieve a secure computing environment.

As a result of this, it has become possible to treat a password that has been conventionally controlled only by BIOS using the OS and the application having the network function, National language Support (NLS), Graphical User Interface (GUI) or the like, thereby making it possible to provide service, such as password backup, distribution, policy setting on security, or the like to an information system without decreasing a security level.

In addition, in order to set the Trusted Platform Module (TPM) in conformity with TCG to an enable state, it is necessary under the prior art to enter a supervisor password on the OS. In practice, however, a password with administrator authority is informed when an end user or an administrator executes an enabling operation on an end user's machine. As opposed to this, when the present invention is used, it becomes possible to authenticate the end user via the network, allowing a TPM chip to be set to an enable state without an administrator's interaction.

Moreover, the present invention makes it possible to securely perform an update of system software, a patch for an OS, or a distribution of a modified module.

It should be understood that the present invention is not limited to aforementioned embodiments, but may be achieved with a suitable modification. For example, in the aforementioned embodiment, it is configured in such a way that the load of the system image to area 20 is executed through CD-ROM drive 4 or network device 5, but instead of this, it may be executed through a USB memory or a hard disk.

While the invention has been particularly shown and described with reference to a preferred embodiment, it will be understood by those skilled in the art that various changes in form and detail may be made therein without departing from the spirit and scope of the invention.

What is claimed is:

1. A method comprising:
activating a boot block that contains a first public key;
verifying a system Basic Input/Output System (BIOS) that contains a second public key and a first digital signature, the verifying being performed by confirming that the first and second public keys match;
in response to a determination that the first and second public keys match, activating the BIOS and loading a system image to a real device;
verifying the system image by confirming that the first digital signature that is stored in the system BIOS matches a second digital signature that is stored in a mass storage device;
in response to the first and second digital signatures matching, creating a virtual mass storage device;
transferring control of the virtual mass storage device to a boot strap code in an operating system image; and
booting the operating system image from the virtual mass storage device.

2. The method of claim 1, wherein the step of loading the system image to the real device further comprises loading the system image to the real device across a network connection.

3. The method of claim 1, further comprising setting an enabling trap before the booting of the operating system image.

4. The method of claim 1, further comprising loading a network boot program.

5. The method of claim 1, further comprising verifying the network boot program.

6. The method of claim 1, wherein the step of transferring control of the virtual mass storage device to a boot strap code in an operating system image further comprises activating a preboot execution environment boot code.

7. The method of claim 1, wherein the step of confirming that the first digital signature that is stored in the system BIOS matches the second digital signature that is stored in the mass storage device further comprises confirming that the first digital signature that is stored in the system BIOS matches the second digital signature that is stored in the mass storage device using a hash operation.

8. A system comprising:
a memory; and
a processing unit coupled to the memory, wherein the processing unit is configured for:
activating a boot block that contains a first public key;
verifying a system Basic Input/Output System (BIOS) that contains a second public key and a first digital signature, the verifying being performed by confirming that the first and second public keys match;
in response to a determination that the first and second public keys match, activating the BIOS and loading a system image to a real device;
verifying the system image by confirming that the first digital signature that is stored in the system BIOS matches a second digital signature that is stored in a mass storage device;

in response to the first and second digital signatures matching, creating a virtual mass storage device;

transferring control of the virtual mass storage device to a boot strap code in an operating system image; and booting the operating system image from the virtual mass storage device.

9. The system of claim 8, wherein the loading the system image to the real device further comprises loading the system image to the real device across a network connection.

10. The system of claim 8, wherein the processing unit is further configured for setting an enabling trap before the booting of the operating system image.

11. The system of claim 8, wherein the processing unit is further configured for loading a network boot program.

12. The system of claim 8, wherein the processing unit is further configured for verifying the network boot program.

13. The system of claim 8, wherein the transferring control of the virtual mass storage device to a boot strap code in an operating system image further comprises activating a pre-boot execution environment boot code.

14. The system of claim 8, wherein the confirming that the first digital signature that is stored in the system BIOS matches the second digital signature that is stored in the mass storage device further comprises confirming that the first digital signature that is stored in the system BIOS matches the second digital signature that is stored in the mass storage device using a hash operation.

15. A machine-readable medium having a plurality of instructions processable by a machine embodied therein, wherein the plurality of instructions, when processed by the machine, causes the machine to perform a method, the method comprising:

activating a boot block that contains a first public key;

verifying a system Basic Input/Output System (BIOS) that contains a second public key and a first digital signature, the verifying being performed by confirming that the first and second public keys match;

in response to a determination that the first and second public keys match, activating the BIOS and loading a system image to a real device;

verifying the system image by confirming that the first digital signature that is stored in the system BIOS matches a second digital signature that is stored in a mass storage device;

in response to the first and second digital signatures matching, creating a virtual mass storage device;

transferring control of the virtual mass storage device to a boot strap code in an operating system image; and booting the operating system image from the virtual mass storage device.

16. The machine-readable medium of claim 15, wherein the step of loading the system image to the real device further comprises loading the system image to the real device across a network connection.

17. The machine-readable medium of claim 15, further comprising setting an enabling trap before the booting of the operating system image.

18. The machine-readable medium of claim 15, further comprising loading a network boot program.

19. The machine-readable medium of claim 15, further comprising verifying the network boot program.

20. The machine-readable medium of claim 15, wherein the step of transferring control of the virtual mass storage device to a boot strap code in an operating system image further comprises activating a preboot execution environment boot code.

* * * * *